| United States Patent [19] | [11] 3,951,001 |
| Saito et al. | [45] Apr. 20, 1976 |

[54] VERNIER DRIVE MECHANISM

[76] Inventors: Takayoshi Saito; Taro Saito, both of 18-23, Kaminoge 1-chome, Setagaya, Tokyo, Japan

[22] Filed: May 21, 1974

[21] Appl. No.: 471,990

[52] U.S. Cl. .............................. 74/10.52; 74/10 R; 74/10.54
[51] Int. Cl.² ........................................ F16H 35/18
[58] Field of Search .............. 74/10 R, 10.33, 10.27, 74/10.52, 10.54, 10.5

[56] References Cited
UNITED STATES PATENTS

| 2,039,622 | 5/1936 | Bennett ............................. 74/10.52 |
| 2,869,373 | 1/1959 | Erbe et al. ........................ 74/10.52 |
| 3,188,872 | 6/1965 | Weiner ............................. 74/10.52 |
| 3,574,285 | 4/1971 | Valdettaro ........................ 74/10.52 |

*Primary Examiner*—Samuel Scott
*Assistant Examiner*—Randall Heald
*Attorney, Agent, or Firm*—Oblon, Fisher, Spivak, McClelland & Maier

[57] ABSTRACT

This invention relates to a vernier drive mechanism, in which a vernier shaft always being subjected to the elasticity of a coil spring is put into a hollow part of a main shaft in a freely rotatable manner, a housing is put outside the main shaft also in the freely rotatable manner, a part having a hexagonal section or a shape causing the similar effect is made at the center of the main shaft, holes open to the hollow part of the main shaft are made on the three planes placed radially at the same angle of the six peripheral planes, balls are put into the holes and are made to contact with a small diameter part of the vernier shaft and the inner surface of the housing by the elasticity of the spring so as to rotate planetarily by the rotation of the vernier shaft and to turn the main shaft at a speed slower than that of the vernier shaft.

11 Claims, 17 Drawing Figures

VERNIER DRIVE MECHANISM

SUMMARY OF THE INVENTION

This invention relates to a vernier drive mechanism to finely adjust a variable capacitor, a variable resistor, etc. which are used for selecting frequency or adjusting volume in communication equipment or sound equipment, and especially relates to the improvement of the vernier drive mechanism of a planetary driving system to obtain speed-reduced rotation by utilizing the planetary rotation of balls put inside a shaft having three holes.

This invention is easily applicable exceptionally also as a speed reducing mechanism of a small type of variable rotating shaft in a field different from the above mentioned.

Figure 1:
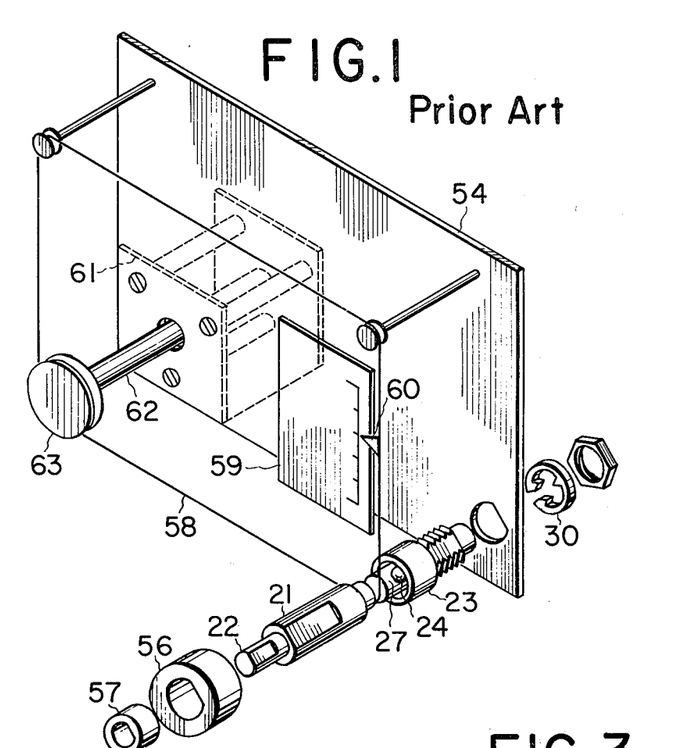
FIG. 1 is an isometric view showing the condition to attach the known vernier drive mechanism to a variable capacitor or a radio.

As a mechanism of a planetary driving system similar to the mechanism of the present invention, the mechanism shown in FIG. 1 is known. The mechanism is provided with a vernier shaft 22 inside a hollow part of a cylindrical main shaft 21 and a housing 23 outside the main shaft 21 respectively in a freely rotatable manner. The main shaft 21 has three balls 24 which are respectively put into three holes 28 placed radially at the same angle of 120°. In order to provide the three holes 28 at equal intervals on the circular wall 27 of the cylindrical main shaft 21, a special device must be used. The operation is very difficult and needs a high degree of skill and a huge cost. Unless these three holes are precisely provided at equal intervals of 120°, the main shaft 21 and the vernier shaft 22 cause irregular rotation or distortion, and thereby the required speed-reduction ratio or rotation torque can not be obtained. Moreover since the three holes 28 are made on the circular wall 27 of the main shaft 21, each of the hole 28 has an oval shape and the inner corner of the holes 28 at the circular wall 27 has an acute angle. Thereby there is a defect that the walls 27 are thin around the holes.

The essential feature of this invention is that a part of the main shaft, within which the holes are provided, is formed into a hexagonal section or a shape causing the similar effect in order to make a planar periphery around the hole so as to easily open the holes radially at the exact same angle of 120° and to make it possible to obtain effective speed-reduction ratio and rotation torque. Other features of this invention will become clear in the detailed description of the invention.

BRIEF DESCRIPTION OF THE DRAWINGS

The accompanying drawings show some embodiments of this invention.

FIGS. 4 – 7 show the first embodiment of the present invention;

FIG . 6 is a sectional view along the line VI — VI of FIG. 7;

FIGS. 8 – 11 show the second embodiment of the present invention;

FIGS. 14 and 15 show the fifth embodiment of the present invention;

DETAILED DESCRIPTION OF THE INVENTION

FIGS. 4 – 7 show the first embodiment of the present invention, in which a vernier drive mechanism of the present embodiment is used for adjusting a variable capacitor in the selection of a radio program. Other embodiments will be explained also relating to the above condition. The condition where the mechanism of the invention is used for a variable resistor, etc., in volume adjustment of other sound equipment is not essentially different from the present invention.

Figure 6:
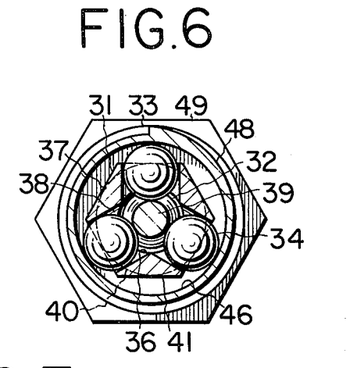

Particularly in the present embodiment, the mechanism of the invention is used in a radio-program selecting equipment of a cord hanging system similarly to the known mechanism of FIG. 1. In the drawings 31 is a main shaft, and the main shaft 31 has a hollow part 36 along the axial core. One part near the central part of the main shaft 31 has a hexagonal section 37 as shown in FIG. 6. The sectional shape of the other part of the main shaft 31 is the circular shape 40 which is inscribed to the hexagonal section 37 or has the diameter smaller than that of the hexagonal section 37 (the circle 40 is shown with a dotted line in FIG. 6.) In each central part of the three planes of the six peripheral planes 41 at the hexagonal section part 37, holes 38 to receive balls 34 to rotate planetarily are made respectively penetrating to the hollow part 36. At the forward end of the main shaft 31, a cord hanging part 42 is made. 32 is a vernier shaft, and the shaft 32 is inserted into the hollow part 36 of the main shaft 31 in the freely rotatable manner. At the opposite part of the hole 38 of the main shaft 31 around the forward part of the vernier shaft 32, a small diameter part 39 having R-shaped curve is made. The small diameter part 39 contacts with each of the three balls 34 at the same angle and makes each ball 34 project suitably along the curve. The rear part of the vernier shaft 32 is projecting from the rear part of the main shaft 31 and has knurls 43. The knurled rear part of the vernier shaft 32 is fixed inside a serrated shaft 44 which has required numbers of serrations 45 on the periphery thereof.

Figure 7:
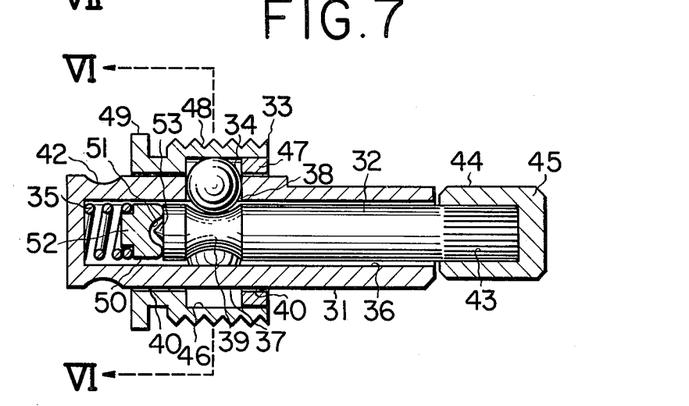
FIG. 7 is a central sectional elevation view along the line VII — VII of FIG. 5.

33 is a cylindrical housing supporting the main shaft 31 in the freely rotatable manner. The inner surface of the housing 33 placed over the six planes 41 of the hexagonal section part 37 is in contact with each ball 34 projecting from the each hole 38 opened on the three planes of the six planes 41. 46 is an inner surface of the housing 33 on which the three balls 34 roll. At the opening of the housing 33, there is a knurled ring 47 which is supporting the main shaft 31 in the freely rotatable manner by being placed over the circular part 40 of the main shaft 31.

Therefore the forward and rearward movement of the main shaft 31 is avoided by contacting both ends of the hexagonal section part 37 with the small diameter supporting part of the housing 33 and the knurled ring 47. Namely the present embodiment does not need a snap ring 30 to avoid the forward and rearward movement of the main shaft 21 as shown in FIG. 1. Moreover the inner surface 46 of the housing 33 can be completely sealed by the ring 47, so that the invasion of some foreign substance is prevented.

The periphery of the housing 33 has threads 48 and a hexagonal fastening part 49 is made at one end of the housing.

34 are the three planetarily rotating balls which are put into the holes 38 of the main shaft 31 and are contacting respectively with the periphery of the small diameter part 39 of the vernier shaft 32 and the inner surface 46 of the housing 33. The balls 34 rotate by turning the vernier shaft 32. By their rotation the balls 34 roll on the surface 46 of the housing 33 and revolve around the vernier shaft 32. By their revolution the balls 34 make the main shaft 31 turn at the speed slower than that of the vernier shaft 32 through the holes 38.

35 is a spring put at the bottom of the hollow part 36 of the main shaft 31. The spring 35 gives elasticity, which is enough to push the vernier shaft 32 out from the hollow part 36, to the vernier shaft 32 and pushes the balls 34 to the small diameter part 39 of the vernier shaft 32 and the inner surface 46 of the housing 33 along the curve of the small diameter part 39.

Between the spring 35 and the vernier shaft 32, there is a seat 50 which is one of the features of the present invention as described in the following. One end of the seat 50 close to the vernier shaft 32 is provided with a pit 51 to envelop a flash 53 made in the manufacturing step of the vernier shaft 32. On the other hand another end of the seat 50 close to the spring 35 has a projected part 52 receiving the spring 35.

Figure 4:
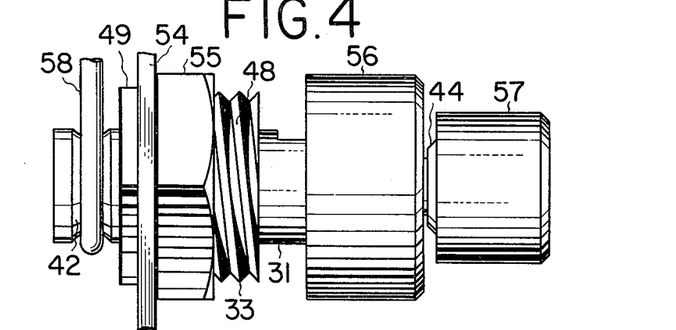
FIG. 4 is a side elevation view showing the condition where accessaries are attached.
Figure 5:
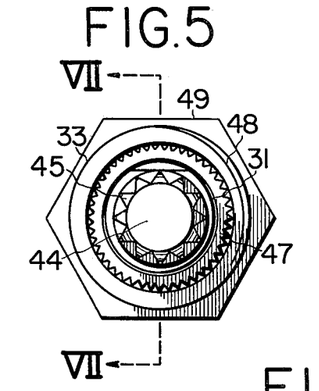
FIG. 5 is a front elevation view.

FIG. 4 shows the condition where the vernier drive mechanism of the present embodiment is attached by using some accessaries. In the drawings, 54 is the chassis or printed plate of a radio. 55 is a nut to attach the mechanism of the invention by engaging with the thread 48 of the housing 33 and tightening the fastening part 49 to the chassis or printed plate of the radio. 56 is a knob for rough adjustment fixed at the rear periphery of the main shaft 31. The knob 56 is used to directly rotate the main shaft 31 without reducing the speed. 57 is a knob for fine adjustment fixed outside the serrated shaft 44 of the vernier shaft 32, and the knob 57 is used to reduce the rotating speed of the main shaft 31. 58 is a cord put around a cord hanging part 42 of the main shaft 31. Similarly to the known mechanism shown in FIG. 1, the cord 58 moves a needle pointer 60 on a dial 59 and a pulley 63 of a variable shaft 62 of a variable capacitor 61 according to the speed-reduced rotation of the main shaft 31.

Hereinafter the operation of the vernier drive mechanism will be described. In order to finely adjust the variable shaft 62 of the variable capacitor 61, the vernier shaft 32 is turned in the required direction. The balls 34 rotate by receiving the rotation of the shaft 32 through the small diameter part 39, and further by their own rotation the balls roll on the inner surface 46 of the housing 33 and revolves in the same direction as the rotation of the vernier shaft 32. The main shaft 31 receiving the revolution of the balls 34 at the holes 38 rotates similarly to that revolution. Therefore the ratio of the rotation of the vernier shaft 32 and the main shaft 31 is almost determined by the ratio of the diameter of the small diameter part 39 and the inner surface 46 of the housing 33. In general the ratio of the speed reduction is about 5 : 1.

The first feature of the present invention which is clear by the present embodiment described hereinbefore is to delete the defect of the known mechanism by providing the holes 38 at the hexagonal section part 37 of the main shaft 31.

Namely if the holes 38 are provided at the hexagonal sectionn part 37 according to the invention, the plane through which each of the holes 38 open is always flat and perpendicular to the drill bore defining the holes 38. Thereby instability of the drill and the main shaft 31 does not occur, and the right circular hole 38 can be made correctly. Further, since the main shaft 31 has a hexagonal section, the holes 38 can keep precisely a distance of 120° between each other. On the contrary in case the hole is provided on the circular section part as in the known mechanism, since a drill touches the circular surface, the point of the drill slides on the circular surface, and thereby the main shaft 21 turns, and it is difficult to precisely keep the distance of 120°. Moreover since the holes are made on the circular surface, the time for boring the hole with the drill is different depending on the point on the surface and an oval-shaped hole is made.

By making the hexagonal section, superior effect is displayed regarding to the function of the vernier drive mechanism as described hereinbelow.

First an edge of the hole 38 is thicker than that of a hole on a circular surface of the known mechanism, so the strength is greater than the known mechanism. Because in case of utilizing the hexagonal section, the holes 38 open perpendicularly to the flat plane 41, but on the circular surface the holes 38 open along the radial line of the circle 27 and the edge of the holes 38 have an acute angle.

Second a restriction torque is larger comparing to the known mechanism. The restriction torque means the torque for the balls 34 to begin to slip when the vernier shaft 32 is turned restricting the main shaft 31. Because it is clear from the experience that if the balls 34 project from the upper part of the holes 38, a larger restricting torque can be obtained, and the projection of the ball 34 is larger in the hexagonal section part than in the circular section part.

Third since a larger space is made between the main shaft 31 and the inner surface of the housing 33, lots of grease can be preserved and thereby the smooth operation is obtained and the durability is improved.

One method to make the hexagonal section part 37 will be explained in the following. As the material of the main shaft 31, a bar of brass, etc., having hexagonal section is used and a round bar is not used. The bar is made into a circular part 40 by cutting while the part 37 remains so as to provide for the holes 38. The other method is to the same make as one body from synthetic resins.

The hexagonal section of the main shaft 31 may be any shape having six planes crossing each other with 120° so as to cause the similar effect as a hexagon. More particularly, the shaft 31 section may in fact simply comprise any configuration having at least three planes equiangularly disposed about the axis thereof, that is, spaced 120° apart. Especially in case the shaft is made from synthetic resins, holes can be previously made.

The second feature of the invention which is clear by the present embodiment is to delete the defect which will be described in the following by putting a seat 50 between the vernier shaft 32 and the spring 35.

Figure 2:
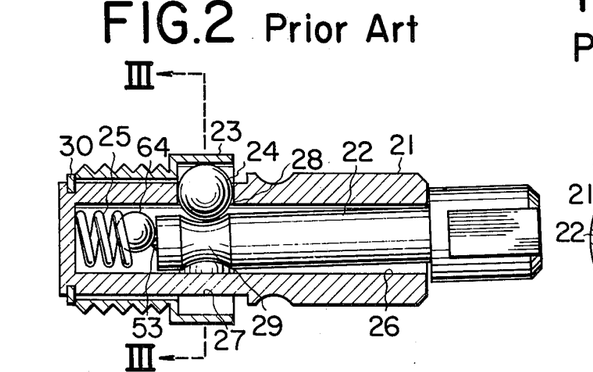
FIG. 2 is a central sectional elevation view of the vernier drive mechanism of FIG. 1.
Figure 3:
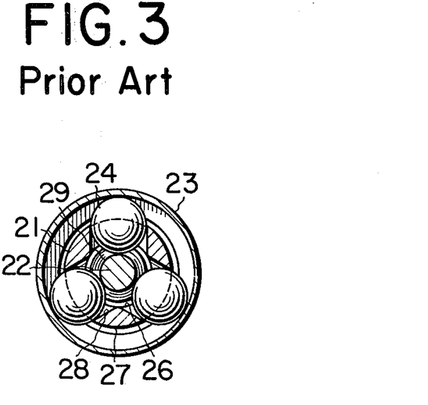
FIG. 3 is a sectional view along the line III — III of FIG. 2.

As shown in FIG. 2, in the known mechanism the center of the point surface of the vernier shaft 22 cannot be flat, because the cutting work causes a flash. Therefore a ball 64 cannot accurately push the center of the point surface of the vernier shaft 22. Accordingly if the spring pressure is given to the vernier shaft 22 through the ball 64 as in the known mechanism, the pressure of the spring 25 cannot be equally distributed. Thereby unstable rotation occurs and the required rotation torque cannot be obtained, and in the extreme case eccentricity occurs as shown in FIG. 2. Moreover since the spring pressure is conveyed through the ball, the spring should have a large spring constant (kg/mm). However if the spring pressure is large, smooth torque cannot be obtained. To keep the smooth rotation brass material is used for the vernier shaft, but the life of the brass vernier shaft is short. Moreover since a steel ball receives the spring pressure, the number of coils of the spring should be large and the diameter of the cord should be large, thereby there is a defect that it is difficult to make the known mechanism small.

In the present invention, a seat 50 is used. The seat 50 has a pit 51 which can envelop the flash 53 and has a curved surface contacting with the vernier shaft 32 to eliminate the friction. At the other side of the seat 50 a projection part 52 is made to prevent the instability of the spring 35 in the hollow part 36 of the main shaft and to equally convey all the spring pressure of the spring 35 to the vernier shaft 32. For the above reason, in the conventional mechanism, a fine spring 25 both ends of which are ground is used to obtain the required torque. However by using the seat of the invention, a piano line which diameter is much smaller than the conventional cord can be used for a spring, thereby the cost of the spring becomes cheap, the durability of the spring is improved, and the mechanism can be made small easily.

FIGS. 8 – 11 show the second embodiment of the present invention. The vernier drive mechanism of the invention is directly attached to a variable shaft of a variable capacitor. In the drawings the same numbers as the above-mentioned show the same parts.

Figure 9:
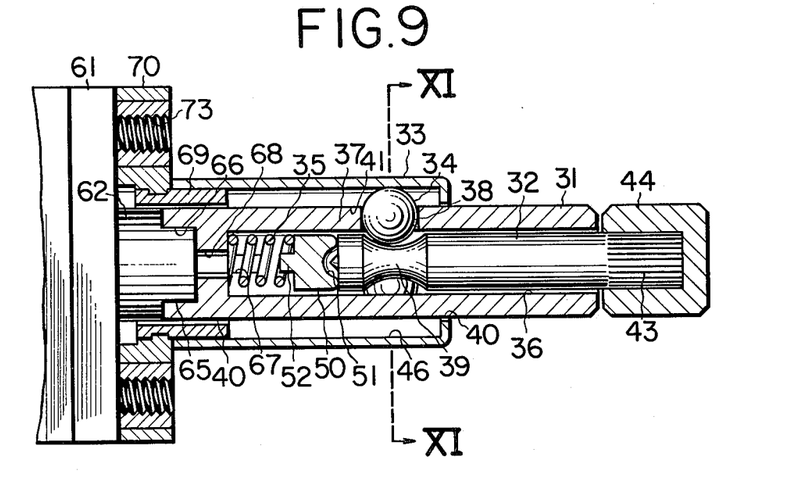
FIG. 9 is a central sectional elevation view showing the condition where the said variable shaft is already attached.
Figure 10:
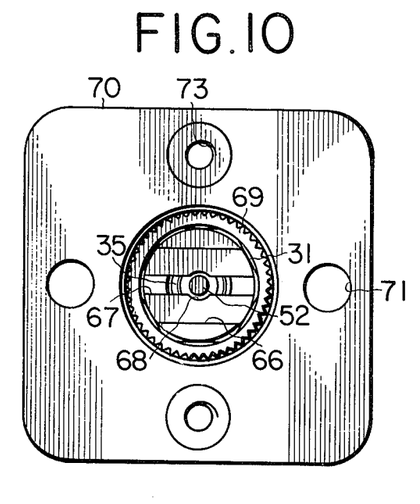
FIG. 10 is a rear elevation view.
Figure 11:
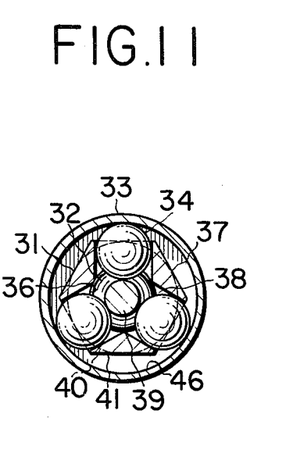
FIG. 11 is a sectional view along the line XI — XI of FIG. 9.

The present embodiment has the features as in the following. A slot 66 having a determined width is provided upon the end of the main shaft 31. The slot 66 is put over a plane part 65 of the variable shaft 62 of the variable capacitor 61 to be directly connected with the shaft 62. At the bottom of the slot 66 a slit 67 of a very narrow width is made with an optional depth. The slit 67 is made as required to give suitable elasticity to the connection of the slot 66 and the variable shaft 62. If the main shaft 31 has elasticity, the slit 67 need not be made. Further a small hole 68 open to the hollow part 36 is made at the central bottom of the slot 66. The hole 68 is used to push out the spring 35 and the seat 50 when the vernier shaft 32 is pulled out from the hollow part 36, and it is not necessarily provided.

On the other hand the housing 33 can be made easily from a pipe having an inner surface 46 which can contact with the balls 34. Namely the pipe is drawn at one end to support the main shaft 31 and is cut to the determined length. Conventionally the housing was made by drawing from a round bar with an automatic lathe, etc. However if it is made from a pipe, the cost of the product becomes very cheap. The housing 33 is put over a shaft receiving part 69 which will be described later and is fixed to an attaching base 70.

The attaching base 70 is made from synthetic resins or metal and is used to fix the vernier drive mechanism to a variable capacitor 61 and further to attach the mechanism and the capacitor to a chassis or printed plate of a radio. A shaft receiving part 69 which is knurled on the periphery thereof is fixed into the center of the base 70. Of course the part 69 may be made as one part of the attaching base 70 by using an engineering plastic, etc., which strength is high. The receiving part 69 has an inner diameter which is enough to seal and fix the variable shaft 62 of the variable capacitor 61 and the cylinder part 40 of the main shaft 31. The rear part of the receiving part 69 is projected from the surface of the base 70 to fix the housing 33. Further the part 69 contacts with the forward end of the hexagonal section part 37 of the main shaft 31 inside the housing 33 to prevent the forward movement of the main shaft 31.

Therefore the main shaft 31 is inserted into the housing 33 from the forward opening of the housing 33 with the vernier shaft 32 attached. Thereafter the housing 33 with the main shaft 31 attached is put over the shaft receiving part 69 at the forward opening and is fixed to the attaching base 70.

Figure 8:
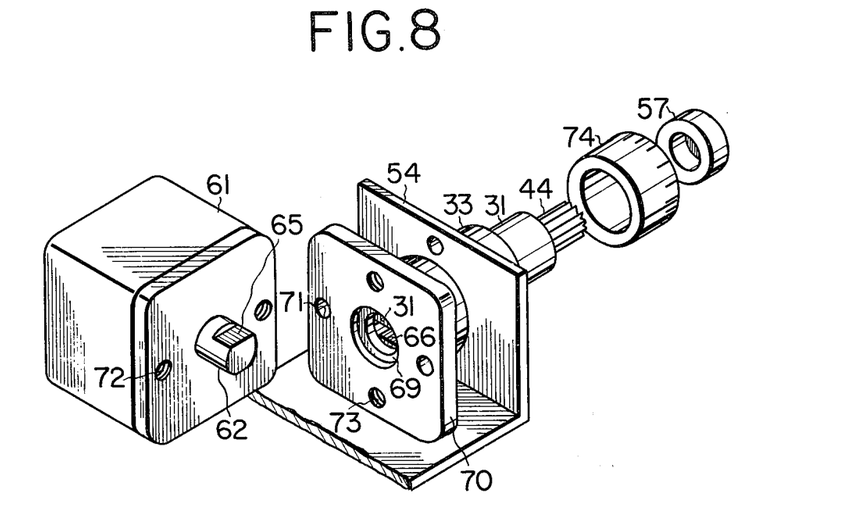
FIG. 8 is an isometric view showing the condition to attach the mechanism of the invention to a variable shaft of a variable capacitor.

FIG. 8 shows the condition where the mechanism of the present embodiment is attached to a variable capacitor 61 and further the mechanism and the capacitor are attached to a chassis or printed plate of a radio. In the drawing, 71 is a hole suitably provided on the base 70 and the hole is used to attach the present mechanism to a case by fitting a tapped hole 72 opened at the front of the case of the variable capacitor 61. 73 is a tapped hole suitably provided on the attaching base 70 and the hole 73 is used to attach the mechanism and the variable capacitor 61 to the chassis or the printed plate of a radio. The hole 73 may have a thread bushing or may be tapped directly as shown in FIG. 9. 74 is a dial cylinder fixed outside the rear part of the main shaft 31 and the periphery has a scale. The cylinder 74 rotates together with the main shaft 31 and the variable shaft 62 of the variable capacitor 61 to indicate the condition of the capacitor 61.

As it is clear by the description of the present embodiment, the third feature of the invention is to make a slot 66 at the forward end of the main shaft 31, insert one end of the variable shaft 62 of the variable capacitor 61 into the slot 66, and further to envelop the periphery of the inserted part by sealing with the shaft receiving part 69 or the inner wall of the attaching base 70.

In the conventional dial mechanism using a cord, when a cord happens to slip, the current scale is not indicated, and a variable capacitor cannot be rotated with the cord. However in the mechanism of the present invention, the main shaft 31 and the variable shaft 62 can be precisely connected without eccentricity. Therefore the rotation of the main shaft 31 can be conveyed to the variable shaft 62 without any slide and there is no anxiety that the dial indicates differently from the real condition of the variable capacitor 61.

The fourth feature of the invention is to fix a cylindrical housing 33 with a main shaft 31 inserted to a shaft receiving part 69 projected from an attaching base 70 by means of knurling, etc. Namely in order to put the attaching base 70 and the cylindrical housing 33 together, the periphery of the shaft receiving part 69 is knurled. By that means, the housing 33 can be fixed to the base 70 only by pushing. Moreover the main shaft 31 is supported by the inner surface of the attaching base 70 and the rearward end of the housing 33 so as to be able to rotate without eccentricity. Further in the present mechanism, processing of parts and steps for assembly are saved and production is rationalized and uniformalized for each part. The space for balls 34 inside the housing 33 to rotate can be sealed completely so that invasion of dust or trash is prevented and thereby the durability is improved.

Figure 12:
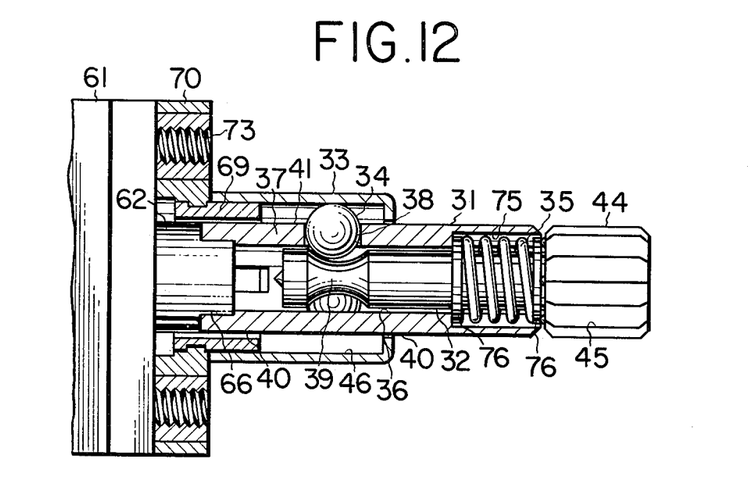
FIG. 12 is a central sectional elevation view showing the third embodiment of the present invention.

FIG. 12 shows the third embodiment of the present invention. Similarly to the second embodiment, the vernier drive mechanism is directly connected with a variable shaft of a variable capacitor. In the drawing the same numbers as in the other drawing show the same parts.

As it is clear from FIG. 12, the fifth feature of the invention is to provide a spring 35 to push the vernier shaft 32 at the rear end of the main shaft 31 and not at the forward end of the vernier shaft 32 inside the hollow part 36 of the main shaft 31.

Namely a hole 75 is provided, to house the spring 35, having a diameter a little larger than that of the hollow part 36. The spring 35 is put outside the rear part of the vernier shaft 32. Thereafter the vernier shaft 32 is put into the hollow part 36 so as to place one end of the spring 35 at the bottom of the hole 75 and another end of the spring 35 at the end surface of the serrated shaft 44. If washers 76 are put at both ends of the spring 35, the disposition of the spring in the hole 75 is secured. Further if the washer 76 is bent over the spring 35, the movement of the axial core of the spring 35 can be prevented, and the area of the washer to contact with the bottom of the main shaft and the end surface of the serrated shaft 44 becomes small so that the friction is eliminated so that the smooth rotation can be obtained.

Since the spring 35 and the seat 50 provided at the forward end of the vernier shaft 32 can be omitted by the features described hereinbefore, the forward end of the main shaft 31 can be shortened and thereby the hollow part 36 can be a penetrating hole.

Figure 13:
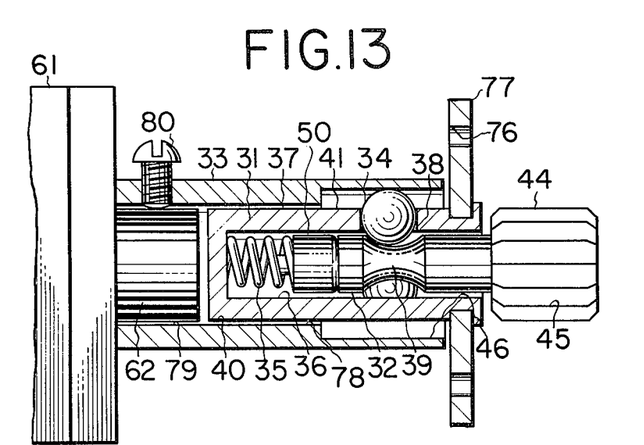
FIG. 13 is a central sectional elevation view showing the fourth embodiment of the present invention.

FIG. 13 shows the fourth embodiment of the present invention. In the drawing the same numbers as in the other drawing show the same parts. As it is clear from the present embodiment, the sixth feature of the invention is to fix the main shaft 31 to a chassis or printed plate and to directly connect the housing 33, which is fixed in the said other embodiments, with the variable shaft 62 of the variable capacitor 61 or variable resistor.

Namely a fixing plate 77 is previously fixed to the rearward end of the main shaft 31 by an easy means of calking, etc. The fixing plate 77 is used to fix the vernier drive mechanism of the invention to the chassis or printed plate and has a suitable fixing hole 76.

The housing 33 is a cylinder consisting of the wall 46 contacting internally with the balls 34 projecting from the hexagonal section part 37 of the main shaft 31 and the wall 78 supporting the circular part 40 of the main shaft 31. The length of the wall 78 supporting the circular part 40 of the main shaft 31 is extended to comprise a connecting part 79 which can fix the variable shaft 62. The connecting part 79 has an easy fixing means like a screw 80.

In the present embodiment, when the vernier shaft 32 is turned, the housing 33 is turned in the opposite direction at a speed slower than that of the vernier shaft 32 according to the rotation of the balls 34.

Figure 14:
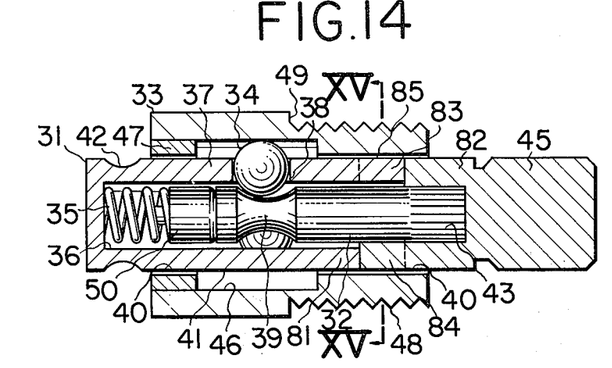
FIG. 14 is a central sectional elevation view.
Figure 15:
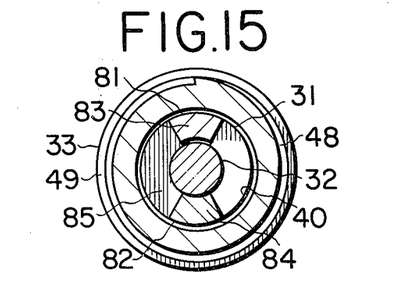
FIG. 15 is a sectional view along the line XV — XV of FIG. 14.

FIGS. 14 and 15 show the fifth embodiment of the invention, i.e., the case where the mechanism of the invention is used in an apparatus utilizing a cord similarly to the first embodiment. In the drawings the same numbers as in the other drawings show the same parts.

As it is clear from the present embodiment, the seventh feature of the invention is to divide the main shaft 31 into a front part 81 and a rear part 82 and provide a clutch 85 between the said both parts 81 and 82 to connect them, and further to fix the vernier shaft 32 to the rear part 82 of the main shaft 31.

Namely as shown in FIG. 14, the main shaft 31 is cut at the circular part inside the housing 33 to divide the same into the front part 81 and the rear part 82. As shown in FIG. 15, at the divided surface of the front and rear parts 81 and 82 of the shaft 31, engaging parts 83 and 84 having the required section area are projected and an intermittently engaging clutch 85 is made in the manner that the said engaging parts 83 and 84 are freely rotatable. Further the vernier shaft 32 is fixed at the rear part 82 of the main shaft 31 by means of a knurl 43, and the small diameter part of the vernier shaft 32 is placed at the front part 81 of the main shaft 31 to contact with the balls 34.

As a result, even if the rear part 82 of the main shaft 31 is turned in any direction, the rear part 82 makes only the vernier shaft 32 turn until the clutch 85 engages, i.e., the engaging part 84 contacts with the other engaging part 83. Therefore during that time the front part 81 of the main shaft 31 is turned slowly by the planetary movement of the balls 34 receiving the rotation of the vernier shaft 32. After the front and rear parts 81 and 82 of the main shaft 31 are connected by the clutch 85, the front part 81 is directly turned by the rear part 82, and thereby the speed of the rotation is not reduced.

Therefore the mechanism of the present embodiment is suitable for the case that fine adjustment is necessary after rough adjustment. Namely in the mechanism, after the front part 81 is directly turned by the rear part 82 until the needle pointer is placed about at the required dial indicating position, the fine adjustment is done by turning the rear part 82 of the main shaft 31 in the opposite direction to turn the venier shaft 32.

Figure 16:
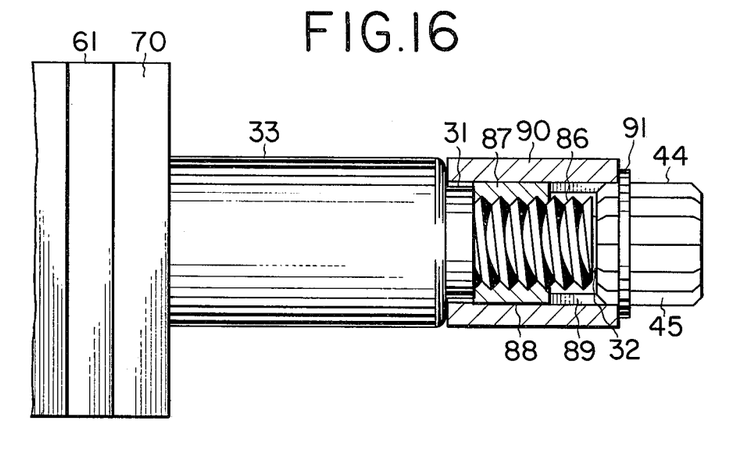
FIG. 16 is a partially sectional view showing the attachment condition in the sixth embodiment of the present invention.

FIG. 16 shows the sixth embodiment of the present invention, that is, an improvement of the second embodiment. In the drawing the same numbers as in the other drawings show the same parts.

As it is clear from the present embodiment, the eighth feature of the invention is to screw a rotation restricting screw part 87 over the rear part of the main shaft 31 to restrict the rotation of the main shaft 31 to the required extent by the stop of the movement of the screw part 87.

In the present embodiment, a suitable male screw 86 is made on the periphery of the rear part of the main shaft 31, and the male screw 86 is engaged with the screw part 87 which moves in the forward and rearward direction along the male screw 86. The periphery of the screw part 87 has a serration 88 which is the same as the serration 45 on the serrated shaft 44 fixed at the rear end of the vernier shaft 32. Between the screw part 87 and the serrated shaft 44 a guide-ring 90 having a serration 89 on the inner surface is disposed such that the serration 89 engages with the serrations 45 and 88 made outside the shaft 44 and screw part 87. Moreover, at one end of the serrated shaft 44 a snap ring 91 is put to stop the forward and rearward movement of the guide-ring 90.

As a result, if the vernier shaft 32 is turned in the optional direction, the main shaft 31 is turned slowly in the same direction according to the rotation of the shaft 32 similarly to the other embodiments. On the other hand the guide-ring 90 rotates at the same speed as the vernier shaft 32 and conveys the rotation to the rotation restricting screw part 87 through the serrations 45, 89 and 88. Therefore the screw part 87 receives the rotation and slides along the serration 89 in the required direction turning the screw part 86 of the main shaft 31. The slide of the screw part 87 stops when one end of the screw part 87 contacts with the serrated shaft 44. If the slide of the screw part 87 stops, the vernier shaft 32 cannot be turned anymore.

Therefore if the distance of the slide of the screw part 87 is decided by the length of the screw parts 86 and 87 considering the speed-reduction ratio of the vernier shaft 32 and the main shaft 31, the turning area of the main shaft 31 can be optionally determined. Accordingly the turning area of the shaft 31 is determined by the variable angle (capacity) of the variable capacitor 61. Moreover if a dial is put on the periphery of the guide-ring 90, the rotation of the vernier shaft 32 proportional to the speed-reduced rotation of the main shaft 31 is obtained, and thereby a long slide distance can be obtained. Namely in the conventional mechanism, unless a dial unit is made large, the wide distance between each scale can not be obtained, so that it was difficult to make the dial unit small. However according to the present invention, as compared with the cord hanging part in the conventional mechanism which turns only ½ time, the guide-ring turns about 2½ times, thereby the dial unit can be made much smaller.

Figure 17:
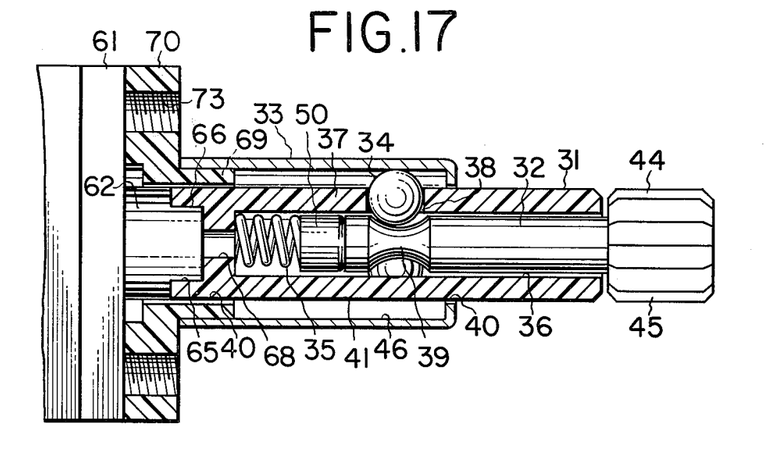
FIG. 17 is a central sectional elevation view showing the seventh embodiment of the present invention.

FIG. 17 shows the seventh embodiment of the invention which is almost the same as the second embodiment for construction. As it is clear from the present embodiment, the ninth feature of the invention is to make the main shaft 31 as one body from synthetic resins.

In the present embodiment, the main shaft 31 is made as one body from hard synthetic resins having suitable elasticity, and a plane part 65 of a variable shaft 62 of a variable capacitor 61 is inserted into a slot 66 made at the forward end of the main shaft 31. In this case, since the synthetic resins have appropriate elasticity, if the slot 66 is made a little smaller than the end of the variable shaft 62, the end of the shaft 62 is tightly fitted into the slot 66 so as to precisely connect the main shaft 31 with the variable shaft 62.

As for the connection of the main shaft 31 and the variable shaft 62, in addition to the use of the said slot 66, for example it can be thought that a hole is opened at one shaft and another shaft is inserted into that hole. In such a case the elasticity of the main shaft 31 also works effectively.

The main shaft of the present embodiment has several advantages as described in the following as compared to a main shaft made from some metallic material having no elasticity through several processings.

1. Since the main shaft is made as one body, if a mold is made once, high quality main shafts can be made cheap. Moreover the holes 38 for receiving balls 34 can be previously opened by dividing the main shaft into three equal parts precisely. Therefore the work for opening the holes 38 and secondary work for chamfering each part can be omitted. Additionally the main shaft need not have a hexagonal section part 37 for opening the hole and a circular periphery is acceptable. However the introduction of the hexagonal section part is functionally superior as described before. FIG. 17 shows this case. In other embodiments, since the three holes 38 are bored with a drilling machine by precisely dividing the main shaft into three equal parts, it is necessary to make a hexagonal section part 37. Therefore a special hexagonal shape bar is used, and thereby the cost for material is expensive. However as clear from the above mentioned, it is needless to say that the cheap cost for processing can compensate for it sufficiently.

2. In case a main shaft is made of metal, since it has no elasticity, unless it is made finely by conforming the width and depth of the slot 66 to the plane part 65 of the variable shaft 62, the connected part of them is easily damaged. However in the present embodiment, since a main shaft 31 has elasticity, the main shaft can be firmly connected with a variable shaft, not requiring a high degree of processing, so as not to cause any damage even after long use.

3. In order to avoid the precise processing of a slot of the main shaft made of metal, if a small slit 67 is made at the bottom of the slot 66 as shown in FIG. 9, it is possible to give elasticity to the connected part of the main shaft and the variable shaft. However there is a defect that the processing for making the small slit 67 is required.

4. From the above reasons, the present embodiment makes it possible to decrease the cost including for materials, processings, and persons to half that of the conventional mechanism.

5. As compared with a main shaft made of metal, it is clear by the experience that the main shaft of the present embodiment can obtain the smooth rotation of a vernier shaft when a grease which has a good torque in low temperature is used under the condition of −20° C. Moreover in the main shaft of the present embodiment, it is possible to prevent the seizure, damage, etc., to be caused by grease due to the friction of metals and extend the life of the shaft.

Each feature of the invention described according to each embodiment can be combined suitably without departing from the spirits of the present invention.

We claim:

1. A vernier drive mechanism comprising:
    a spring-biased vernier shaft disposed within a hollow part of a main shaft, and a housing disposed outside the main shaft, in a freely rotatable manner, respectively;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

2. A vernier drive mechanism comprising:

a vernier shaft disposed within a hollow part of a main shaft in a freely rotatable manner, a spring disposed at the forward end of the vernier shaft for imparting pressure to said shaft through a seat having a pit, a housing disposed outside the main shaft in a freely rotatable manner, a part having at least three planes, equiangularly disposed about the axis of the main shaft, formed at the center of the main shaft, holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

3. A vernier drive mechanism comprising:

a spring-biased vernier shaft disposed within a hollow part of a main shaft, and a housing disposed outside the main shaft, in a freely rotatable manner, respectively;

a slot provided at the forward central part of the main shaft for firmly mating with a variable shaft of a variable capacitor or a variable resistor, the forward part of the main shaft being enveloped by the housing, and a shaft receiving part being attached to the housing or to an inner wall of an attaching base;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

4. A vernier drive mechanism comprising:

a spring-biased vernier shaft disposed within a hollow part of a main shaft, and a housing disposed outside the main shaft, in a freely rotatable manner, respectively;

said housing being fixed to a shaft receiving part, projecting from an attaching base, and the inside of the housing being sealed by the shaft receiving part;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

5. A vernier drive mechanism comprising:

a vernier shaft disposed within a hollow part of a main shaft, and a housing disposed outside the main shaft, in a freely rotatable manner, respectively;

a spring disposed in contact at one end thereof with the rear part of the main shaft and at the other end thereof with a part of the vernier shaft so as to impart elasticity to the vernier shaft;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

6. A vernier drive mechanism comprising:

a spring-biased vernier shaft disposed within a hollow part of a main shaft, and a housing disposed outside the main shaft, in a freely rotatable manner, respectively;

said main shaft being freely fixed to an instrument chassis by means of a fixing plate provided at the rear part of the main shaft, and a connecting part provided as one part of the housing fixing said housing to a variable capacitor or a variable resistor;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

7. A vernier drive mechanism comprising:

a spring-biased vernier shaft disposed within a hollow part of a main shaft, and a housing disposed outside the main shaft, in a freely rotatable manner, respectively;

the main shaft being divided into a front part and a rear part, and intermittently engageable clutch being interposed between both parts, and the vernier shaft being fixed to the rear part of the main shaft so that fine adjustment and rough adjustment can be performed by manipulation of the rear part of the main shaft;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

8. A vernier drive mechanism comprising:

a spring-biased vernier shaft disposed within a hollow part of a main shaft, and a housing disposed outside the main shaft, in a freely rotatable manner, respectively;

a male screw provided on the rear periphery of the main shaft, a screw part engaged with the male screw so as to restrict the range of rotation of the main shaft, said screw part being freely slidable in the forward and rearward directions in response to rotation of the vernier shaft;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

9. A vernier drive mechanism comprising:

a main shfat made in one piece from a hard material having suitable elasticity characteristic of strong synthetic resins;

a spring-biased vernier shaft disposed within a hollow part of the main shaft, and a housing disposed outside the main shaft, in a freely rotatable manner, respectively;

a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter of the vernier shaft and the inner surface of the housing under the influence of the biasing force of the spring so as to rotate planetarily in response to the rotation of the vernier shaft and to turn the main shaft at a speed slower than that of the vernier shaft.

10. A vernier drive mechanism comprising:

a main shaft made in one piece from a hard material having suitable elasticity characteristic of strong synthetic resins, a vernier shaft disposed within a hollow part of the main shaft in a freely rotatable manner;

a spring also disposed inside the hollow part of the main shaft for imparting pressure to the forward end of the vernier shaft through means of a seat having a pit, a housing disposed outside the main shaft in a freely rotatable manner, said housing being fixed to a shaft receiving part projecting from an attaching base, a slot formed at the forward central part of the main shaft for firmly mating with a variable shaft of a variable capacitor or a variable resistor, the forward periphery of the main shaft being enveloped by the housing, the shaft receiving part, and the inner wall of the attaching base, a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

11. A vernier drive mechanism comprising:

a main shaft made in one piece from a hard material having suitable elasticity characteristic of strong synthetic resins, a vernier shaft disposed within a hollow part of the main shaft in a freely rotatable manner, a spring disposed in contact at one end thereof with the rear part of the main shaft and at the other end thereof with a part of the vernier shaft so as to impart pressure to the vernier shaft, a housing disposed outside the main shaft in a freely rotatable manner, said housing being fixed to a shaft receiving part projecting from an attaching base, a slot formed at the forward central part of the main shaft for firmly mating with a variable shaft of a variable capacitor or a variable resistor, the forward periphery of the main shaft being enveloped by the housing, the shaft receiving part, and the inner wall of the attaching base, a part having at least three planes, equiangularly disposed about the axis of the main shaft, formed at the center of the main shaft, and holes open to the hollow part provided within the three planes, the axes of said holes being disposed along radial lines of said part; and balls disposed within the holes for contacting a small diameter part of the vernier shaft and the inner surface of the housing under the influence of the biasing force of the spring so as to rotate planetarily in response to the rotation of the vernier shaft and to turn the main shaft at a speed slower than that of the vernier shaft.

* * * * *